United States Patent [19]

Whitlock et al.

[11] Patent Number: 5,003,719

[45] Date of Patent: Apr. 2, 1991

[54] ELECTROMOTIVE FISH ATTRACTOR

[76] Inventors: Arthur D. Whitlock, Rte. 3, Box 72 A, Henryetta, Okla. 74437; George Spector, 233 Broadway, RM 3815, New York, N.Y. 10007

[21] Appl. No.: 447,786

[22] Filed: Dec. 8, 1989

[51] Int. Cl.⁵ ............................................. A01K 93/00
[52] U.S. Cl. ..................................................... 43/17.5
[58] Field of Search .................... 43/17.5, 17.6, 17.1, 43/42.31

[56] References Cited

U.S. PATENT DOCUMENTS

| | | | |
|---|---|---|---|
| 3,105,233 | 9/1963 | D'Amore | 43/17.5 |
| 3,213,562 | 10/1965 | Salvin | 43/17.5 |
| 3,680,245 | 8/1972 | Brooks | 43/17.5 |
| 4,020,580 | 5/1977 | Chappell | 43/17.5 |
| 4,190,976 | 3/1980 | Hurt | 43/17.5 |
| 4,234,913 | 11/1980 | Ramme | 43/17.5 |
| 4,291,484 | 9/1981 | Young | 43/17.5 |

OTHER PUBLICATIONS

*Field and Stream,* 8-68, p. 102.

*Primary Examiner*—Kurt Rowan

[57] ABSTRACT

An apparatus for attracting fish is provided and consists of a transparent dome removably attached to and sealed with a housing, so as to make interior waterproof. An electrical structure is carried within the housing for producing a buzzing sound to attract the fish. Another electrical structure is carried within the housing which extends into the dome for producing a series of blinking lights to attract the fish.

3 Claims, 1 Drawing Sheet

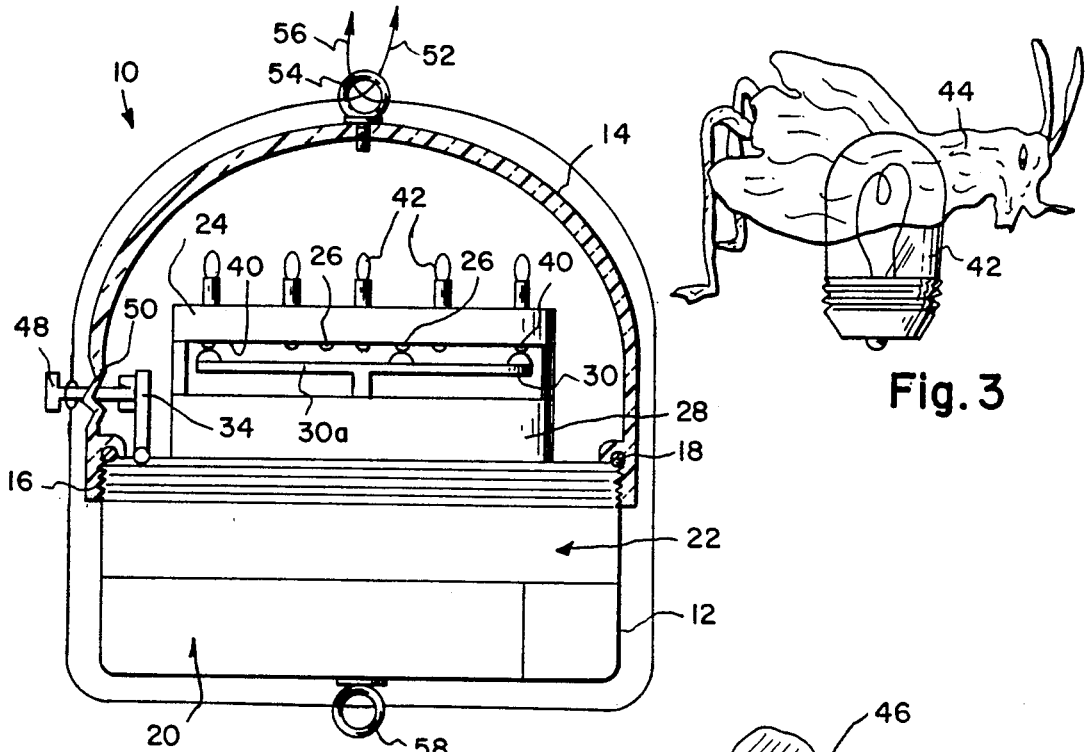
Fig. 1
Fig. 3
Fig. 4
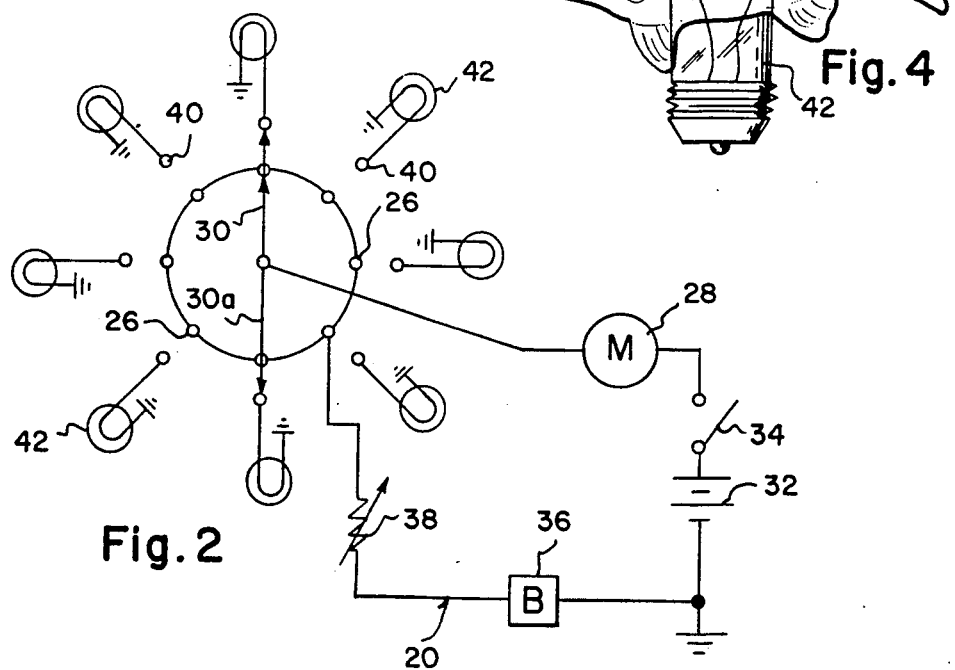
Fig. 2

ELECTROMOTIVE FISH ATTRACTOR

BACKGROUND OF THE INVENTION

The instant invention relates generally to fishing lures and more specifically it relates to an apparatus for attracting fish which provides both blinking lights and a buzzing sound.

There are available various conventional fishing lures which do not provide the novel improvements of the invention herein disclosed.

SUMMARY OF THE INVENTION

A primary object of the present invention is to provide an apparatus for attracting fish that will overcome the shortcomings of the prior art devices.

Another object is to provide an apparatus for attracting fish which when placed into water will produce a series of blinking lights and a buzzing sound which will attract the fish.

An additional object is to provide an apparatus for attracting fish in which the light bulbs can come with various animal shaped covers to help attract the fish.

A further object is to provide an apparatus for attracting fish that is simple and easy to use.

A still further object is to provide an apparatus for attracting fish that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is an elevational view with parts in section of the invention.

FIG. 2 is a schematic view of the electrical system of the invention.

FIG. 3 is an elevational view of a light bulb cover in the shape of an insect.

FIG. 4 is an elevational view of another light bulb cover in the shape of a fish.

DETAILED DESCRIPTION OF THE PREFERRED EMBODIMENTS.

Turning now descriptively to the drawings, in which similar reference characters denote similar elements throughout the several views, FIG. 1 illustrates an apparatus 10 for attracting fish consisting of a housing 12 and a transparent dome 14 removably attached at threads 16 to and sealed by gasket 18 with the housing 12 so as to make its interior waterproof. An electrical structure 20 is carried within the housing 12 for producing a buzzing sound to attract the fish. Another electrical structure 22 is carried withinn the housing 12 which extends into the dome 14 for producing a series of blinking lights to attract the fish.

The electrical structure 20, (see also FIG. 2) includes a stator 24 that has a set of contacts 26 attached in series thereon. An electric motor 28 has a stator arm 30 which will make contact with each of the contacts 26 when the stator arm 30 rotates. A battery 32 is for supplying electricity to the electric motor 28. A switch 34 is electrically connected between the battery 32 and the electric motor 28 for operating the electric motor. A buzzer 36 is electrically connected between the battery 32 and the contacts 26 for making the buzzing sound when the stator arm 30 touches each of the contacts 26. A variable resistor 38 is electrically connected between the buzzer 36 and the contacts 26 to change the volume of the buzzing sound.

The electrical structure 22 includes the stator 24 having a second set of contacts 40 attached independently thereon. A plurality of light bulbs 24 are each releasably connected to top of the stator 24 and are electrically connected to each of the contacts 40 of the second set of contacts.

The electric motor 28 has an extension 30a on the stator arm 30 which will make contact with two opposite positioned contacts 40 of the second set thereof to illuminate the respective light bulbs 42 when the stator arm 30 rotates, thus causing the series of blinking lights.

FIG. 3 shows an insect shaped light bulb cover 44 while FIG. 4 shows a fish shaped light bulb cover 46 which are removably attached to the light bulbs 42 so as to help attract the fish thereto.

As shown in FIG. 1, the switch 34 can have a lever 48 that extends through an accordion wall 50 of the dome 14 so that an actuating cord 52 can be attached to the lever 48 and travel through a top eyelet 54 on dome 14 to turn the switch 34 on when cord 52 is pulled. Another cord 56 is also attached to the lever 48 and travels through a bottom eyelet 58 on the housing 12 and then through the top eyelet 54. When the cord 56 is pulled it will turn the switch 34 off.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for attracting fish which comprises:
   (a) a housing;
   (b) a transparent dome removably attached to and sealed with said housing so as to make interior waterproof;
   (c) means carried within said housing for producing a buzzing sound to attract the fish;
   (d) means carried within said housing which extends into said dome for producing a series of blinking lights to attract the fish; wherein said buzzing sound means includes:
   (e) a stator having a set of contacts attached in series thereon;
   (f) an electric motor having a stator arm which will make contact with each of said contacts when the stator arm rotates;
   (g) a battery for supplying electricity to said electric motor;
   (h) a switch electrically connected between said battery and said electric motor for operating said electric motor;
   (i) a buzzer electrically connected between said battery and said contacts for making the buzzing sound when the stator arm touches each of said contacts; and (j) a variable resistor electrically connected between said buzzer and said contacts to change the volume of the buzzing sound.

2. An apparatus as recited in claim 1, wherein blinking lights means includes:
(k) said stator having a second set of contacts attached independently thereon;
(l) a plurality of light bulbs, each releasably connected to top of said stator and electrically connected to each of said contacts of said set of said contacts; and
(m) said electric motor having an extension on the stator arm which will make contact with two opposite positioned said contacts of said second set thereof to illuminate said respective light bulbs when the stator arem rotates, thus causing said series of blinking lights.

3. An apparatus as recited in claim 2, further including various animal shaped light bulb covers each to be removably attached to one of said light bulbs so as to help attract the fish thereto.

* * * * *